United States Patent
Bodoc et al.

(10) Patent No.: US 11,639,486 B2
(45) Date of Patent: May 2, 2023

(54) DETERGENT COMPOSITION COMPRISING AN INVERSE LATEX COMBINING GLUTAMIC ACID, N,N-DIACETIC ACID, TETRASODIUM SALT AS SEQUESTRANT AND A POLYELECTROLYTE COMPRISING AMPS AND ACRYLAMIDE

(71) Applicant: SOCIETE D'EXPLOITATION DE PRODUITS POUR LES INDUSTRIES CHIMIQUES SEPPIC, Paris (FR)

(72) Inventors: Miruna Bodoc, Castres (FR); Aurelie Colas, La Garenne Colombes (FR)

(73) Assignee: SOCIETE D'EXPLOITATION DE PRODUITS POUR LES INDUSTRIES CHIMIQUES SEPPIC, Paris (FR)

( * ) Notice: Subject to any disclaimer, the term of this patent is extended or adjusted under 35 U.S.C. 154(b) by 36 days.

(21) Appl. No.: 17/114,904

(22) Filed: Dec. 8, 2020

(65) Prior Publication Data
US 2021/0171872 A1     Jun. 10, 2021

(30) Foreign Application Priority Data
Dec. 9, 2019 (FR) ...................... 1913981

(51) Int. Cl.
| | | |
|---|---|---|
| *C11D 3/26* | (2006.01) | |
| *C11D 3/37* | (2006.01) | |
| *C11D 11/00* | (2006.01) | |
| *C08F 2/22* | (2006.01) | |
| *C08F 220/56* | (2006.01) | |
| *C08F 236/20* | (2006.01) | |
| *C08F 236/22* | (2006.01) | |
| *C08F 228/02* | (2006.01) | |
| *C11D 3/33* | (2006.01) | |

(52) U.S. Cl.
CPC ............... *C11D 3/378* (2013.01); *C08F 2/22* (2013.01); *C08F 220/56* (2013.01); *C08F 228/02* (2013.01); *C08F 236/20* (2013.01); *C08F 236/22* (2013.01); *C11D 3/33* (2013.01); *C11D 3/3773* (2013.01); *C11D 11/0023* (2013.01)

(58) Field of Classification Search
CPC .......... C11D 3/2075; C11D 3/26; C11D 3/37; C11D 3/3719; C11D 3/3769; C11D 3/378; C11D 11/00; C08F 2/22; C08F 220/56; C08F 228/62; C08F 236/20; C08F 236/22
See application file for complete search history.

(56) References Cited

U.S. PATENT DOCUMENTS

2009/0074686 A1*    3/2009   Braun ..................... C08F 2/32
                                                          424/59

OTHER PUBLICATIONS

Donald Voet and Judith G. Voet, "Biochemistry," John Wiley & Sons, 1990, p. 250.

* cited by examiner

*Primary Examiner* — Brian P Mruk
(74) *Attorney, Agent, or Firm* — Nixon & Vanderhye

(57) ABSTRACT

Disclosed is a detergent composition (F) for domestic or industrial use including, as thickener, a self-invertible inverse latex including an aqueous phase including: a. a crosslinked anionic polyelectrolyte (P) consisting of: —at least one monomer unit derived from 2-methyl-2-[(1-oxo-2-propenyl)amino]-1-propanesulfonic acid in free acid form or partially or totally salified form; —at least one monomer unit derived from at least one monomer chosen from the elements of the group consisting of acrylamide, N,N-dimethylacrylamide, methacrylamide, N-isopropylacrylamide, N-tert-butylacrylamide; and —at least one monomer unit derived from a polyethylenic crosslinking monomer (AR), b. glutamic acid, N,N-diacetic acid, tetrasodium salt.

20 Claims, No Drawings

DETERGENT COMPOSITION COMPRISING AN INVERSE LATEX COMBINING GLUTAMIC ACID, N,N-DIACETIC ACID, TETRASODIUM SALT AS SEQUESTRANT AND A POLYELECTROLYTE COMPRISING AMPS AND ACRYLAMIDE

This application claims priority to FR Patent Application No. 1913981 filed Dec. 9, 2019, the entire contents of which are hereby incorporated by reference.

BACKGROUND OF THE INVENTION

Field of the Invention

The present invention relates to a detergent composition (F) for domestic or industrial use comprising, as thickener and/or emulsifier and/or stabilizer, a self-invertible inverse latex comprising a novel sequestrant and to the process for preparing such a composition. These detergent or cleaning formulations for industrial or domestic use are either alkaline or acidic. Alkaline detergent or cleaning formulations are generally used for removing greasy soiling from solid surfaces, whereas the acidic detergent or cleaning formulations are used not only for removing soiling, but also for descaling said surfaces. They are particularly suitable for cleaning and descaling agrifood industrial equipment, or for descaling household electrical appliances, such as dishwashers and coffee machines. They are also used for removing concrete or cement residues, and for the cleaning of concrete surfaces that are ingrained with grease, before any painting of said concrete surfaces. Acidic detergent formulations should not cause substantial formation of foam during the cleaning operation in the presence of the soiling to be treated, they should have good wetting and detergent properties. Detergent or cleaning formulations for industrial or domestic use are in the form of powders, concentrates, liquids such as emulsions, and, depending on the case, are used directly or after dilution in a suitable solvent. In liquid form, such as emulsions, they include rheology modifiers during their manufacture.

Description of the Related Art

Mention may be made, among the rheology-modifying polymers for polar phases, of natural polymers or else of synthetic polymers, and in particular the polymers of linear or branched, crosslinked or noncrosslinked anionic or cationic or amphiphilic polyelectrolyte type. These polymers, once introduced into polar phases, have the property of spreading out under the effect of electrostatic repulsions due to the presence of the (negative and/or positive) charges on the linear or branched, noncrosslinked or crosslinked polymer backbone. Rheology modifiers provide both an increase in the viscosity of the polar phase, and also a certain consistency and/or a stabilizing effect imparted to the detergent or cleaning composition. In order to meet the needs of consumers and to improve the detergent formulations, scientists have developed new innovative and varied polymer systems. Thus, the polymers used in detergency or cleaning may act as film-forming agents, rheology modifiers, enable the stabilization of the fatty phases in the emulsions (of water-in-oil type or of oil-in-water type) or the stabilization of particles (pigments or fillers), or else confer particular processing properties (ease of handling and of applying, etc.), also having a direct impact on the appearance of the formula (translucent or opaque).

The rheology-modifying polymers for aqueous phases, mainly polyelectrolytes, result from the radical polymerization of (meth)acrylate type monomers, i.e. esters derived from acrylic acid or methacrylic acid, or else derivatives of acrylamide.

Nowadays, these polymers, which may be in the form of an inverse latex, a concentrated inverse latex, or a powder make it possible to meet the customers' needs in terms of thickening performance, in a polar solvent, such as water for example. The aqueous gels obtained once these polymers are dispersed in water have a smooth appearance, free from grains or lumps, with an ease of handling and of applying.

The liquid form, known under the name "self-invertible inverse latex", or the concentrated liquid form, is a composition that is in the form of a water-in-oil emulsion and comprises:

- an aqueous phase, itself comprising at least one polymer of linear and/or branched and/or crosslinked anionic, or cationic, or ampholytic polyelectrolyte type,
- a fatty phase comprising at least one oil,
- at least one emulsifying surfactant ($S_1$) of water-in-oil type,
- at least one emulsifying surfactant ($S_2$) of oil-in-water type, said polymer being obtained by the use of an inverse emulsion radical polymerization process.

Radical polymerization is known for its sensitivity to the presence of impurities, even in small amounts. Compounds which may lead to a decrease in the rate of polymerization at low concentration are known as inhibitors or retarders. However, the distinction between these two effects is not always simple, and the same compound may have both harmful contributions depending on its concentration in the medium or the nature of the monomers and of the reaction medium. Reproducible performance of the thickening polymers for aqueous phases must be guaranteed in order to ensure a consistent quality of the detergency formulations containing these polymers. For this, the industrial manufacturers must ensure that the polymerization reactions repeatedly follow the same kinetics, more particularly regarding the inhibition time, the reaction exothermicity (° C./min), and the total duration of the polymerization reaction over time. Given these constraints, particular attention is given to the factors that may influence the start of the radical polymerization reaction, for example the presence of oxygen which may retard the radical polymerization reaction by reacting with the radicals generated. These new peroxide radicals have a lower reactivity, since the initiation capacity is reduced. This results in a lower initiation step and a lower propagation rate, therefore ultimately leading to polymers that have different thickening properties. A step of deoxygenation of the medium, notably by purging with nitrogen before starting the polymerization reaction, thus proves necessary.

Another factor directly impacting the polymerization is the presence of metallic species ($Fe^{2+}$, $Fe^{3+}$, $Cu^{2+}$, . . . ) which, in turn, generate an inhibitory effect. In this case, the inhibition may occur during the initiation phase by the reaction of the initiating radicals with metallic impurities, so that the active radical centre then becomes incapable of fixing another monomer unit and becomes inactive during the polymerization.

The metal ions mentioned above may potentially originate from the raw materials or else from the equipment.

The monomers used for the preparation of self-invertible inverse latices may have traces of metal cations. Similarly, it is not impossible to envisage the presence of metallic contaminants in the industrial equipment receiving the polymerization reactions. In most cases, the equipment is made of stainless steel (commonly called stainless steel), and there are several types of stainless steel which differ according to their composition. Stainless steel is an iron-based alloy added to which are nickel, chromium or molybdenum in certain cases. It is chromium which gives stainless steel its antioxidant properties since in the presence of oxygen it is capable, by itself, of regenerating its surface chromium oxide layer, referred to as a passive layer.

However, it is not impossible that, in prolonged contact with sources of pollution, acids, moisture, spray or iron-laden dust, or in the case of deep scratches, the protective layer will then de-passivate (therefore activate) and the stainless steel will oxidize more quickly than it will be capable of protecting itself. In these cases, the appearance of rust can be found, which rust is therefore a source of iron-based metal contaminants.

Considering the risks associated with the presence of all these sources of metal contaminants, the use of a sequestrant is essential. The product generally used is the pentasodium salt of diethylenetriaminepentaacetic acid (also known under the trade name Versenex™ 80). However, the change in the European regulations regarding the classification of the pentasodium salt of diethylenetriaminepentaacetic acid has led to an alternative solution as sequestrant for the preparation of self-invertible inverse latices present in the detergent and cleaning formulations being sought.

Starting from this, one problem which is faced is that of providing an improved detergent composition, i.e. a detergent composition that is effective and has properties more compliant with the change in regulations.

SUMMARY OF THE INVENTION

One solution of the present invention is a detergent composition (F) for domestic or industrial use comprising, as thickener, a self-invertible inverse latex comprising an aqueous phase comprising:
  a. a crosslinked anionic polyelectrolyte (P) consisting of:
    at least one monomer unit derived from 2-methyl-2-[(1-oxo-2-propenyl)amino]-1-propanesulfonic acid in free acid form or partially or totally salified form;
    at least one monomer unit derived from at least one monomer chosen from the group consisting of acrylamide, N,N-dimethylacrylamide, methacrylamide, N-isopropylacrylamide, N-tert-butylacrylamide; and
    at least one monomer unit derived from a polyethylenic crosslinking monomer (AR),
  b. glutamic acid, N,N-diacetic acid, tetrasodium salt.

For the purposes of the present invention, the expression "detergent composition" means compositions that are liquid at 20° C., which are designed and used for the cleaning of various types of surfaces, for instance textile fibres, solid surfaces of various natures, for instance glass, ceramic, tiles, wood, metal or composite materials. These "detergent compositions" find their applications for cleaning soiling from said solid surfaces, for instance for cleaning kitchenware manually or by means of a dishwasher, bottles, laundry manually or by means of a washing machine, floors, metal surfaces soiled with grease, windows, toilets or storage tanks.

It will be noted that the detergent composition will preferably be liquid and could be for domestic or industrial use.

Among these detergent liquid aqueous compositions intended for the detergency of solid surfaces for domestic or industrial applications, alkaline aqueous cleaning compositions and acidic aqueous cleaning compositions may be distinguished. Such detergent liquid aqueous compositions for domestic or industrial use may be in the form of a solution, a gel, an emulsion of oil-in-water type or of water-in-oil type, or in the form of a dispersion. Depending on the case, the detergent composition according to the invention may have one or more of the following features:
  the aqueous phase of the inverse latex comprises at least 0.01 mol % of the glutamic acid, N,N-diacetic acid, tetrasodium salt.
  the polyethylenic crosslinking monomer (AR) is chosen from methylenebis(acrylamide), ethylene glycol dimethacrylate, diethylene glycol diacrylate, ethylene glycol diacrylate, diallylurea, triallylamine, trimethylolpropane triacrylate, diallyloxyacetic acid or a salt thereof, such as sodium diallyloxyacetate, or a mixture of these compounds.
  the crosslinking monomer (AR) is methylenebis(acrylamide) or triallylamine.
  the crosslinked anionic polyelectrolyte of the aqueous phase of the inverse latex comprises:
    a proportion between 20% and 90%, more particularly between 20% and 80%, and more particularly still between 32% and 70% by weight of the monomer unit derived from 2-methyl-2-[(1-oxo-2-propenyl)amino]-1-propanesulfonic acid in free acid form or partially or totally salified form;
    a proportion between 10% and 80%, more particularly between 20% and 80%, and more particularly still between 30% and 68% by weight of the monomer unit derived from at least one monomer chosen from the elements of the group consisting of acrylamide, N,N-dimethylacrylamide, methacrylamide, N-isopropylacrylamide, N-tert-butylacrylamide; and
    a proportion of greater than 0 mol % and less than or equal to 1 mol %, more particularly a molar proportion less than or equal to 0.5 mol %, more particularly less than or equal to 0.25 mol % and very particularly less than or equal to 0.1 mol %, and more particularly greater than or equal to 0.005 mol % of monomer units derived from at least one polyethylenic crosslinking monomer (AR).
  The detergent composition comprises between 0.1% and 10% by weight, more particularly between 0.5% and 8% by weight, more particularly still between 0.5% and 5% by weight of said self-invertible inverse latex.

Within the meaning of the present invention, crosslinked anionic polyelectrolyte (P) denotes, for the polymer (P), a nonlinear polyelectrolyte which is provided in the form of a three-dimensional network which is insoluble in water but which can swell in water and which then results in a chemical gel being obtained.

For the purposes of the present invention, the term "salified" means that the acid function present in a monomer is in an anionic form associated in salt form with a cation, notably alkali metal salts, such as the sodium or potassium cations, or such as nitrogenous base cations such as the ammonium salt, the lysine salt or the monoethanolamine salt ($HOCH_2-CH_2-NH_3^+$). They are preferably sodium or ammonium salts.

According to one particular aspect of the present invention, said self-invertible inverse latex as defined above comprises from 20% by weight to 90% by weight, and more particularly from 30% by weight to 90% by weight, more particularly from 30% by weight to 80% by weight, and even more particularly from 33% by weight to 80% by weight of said crosslinked anionic polyelectrolyte (P).

According to another particular aspect of the present invention, the molar proportion of monomer units derived from 2-methyl-2-[(1-oxo-2-propenyl)amino]-1-propanesulfonic acid in free acid or partially or totally salified form present in said crosslinked anionic polyelectrolyte (P) is greater than or equal to 32 mol % and less than or equal to 100 mol %, more particularly greater than or equal to 40 mol % and less than or equal to 100 mol %. According to one particular aspect of the present invention, the 2-methyl-2-[(1-oxo-2-propenyl)amino]-1-propanesulfonic acid is in the sodium or ammonium salt form. Another subject of the invention is a process for preparing a detergent composition as defined above, comprising a step of preparing the inverse latex comprising the following sub-steps:
a) preparing the aqueous phase as defined above,
b) preparing an organic phase comprising at least one oil (H) and an emulsifying surfactant system ($S_1$) of water-in-oil type,
c) mixing the aqueous phase and the organic phase prepared in steps a) and b) and emulsifying so as to form an emulsion,
d) inerting the emulsion with nitrogen,
e) initiating the polymerization reaction by introducing a free-radical initiator into the inerted emulsion, and
f) introducing into the reaction medium resulting from step e) an emulsifying surfactant system ($S_2$) of oil-in-water type at a temperature between 30° C. and 60° C.

The next steps of the process for preparing a detergent composition are:
i. preparing an aqueous medium comprising water, optionally a solvent, in a jacketed tank in which jacket a heat-transfer fluid circulates at a regulated temperature,
ii. gradual addition of the self-invertible inverse latex obtained in sub-step f) to the aqueous medium prepared during step i) at a moderate temperature between 20° C. and 60° C., under moderate non-shearing stirring, and
iii. adding at least one detergent surfactant to the medium resulting from step ii),
iv. adding at least one optional auxiliary ingredient.

Depending on the case, the method according to the invention may have one or more of the features below:
in step e) the radical initiator is a redox pair which generates hydrogen sulfite ($HSO_3^-$) ions, such as the cumene hydroperoxide/sodium metabisulfite ($Na_2S_2O_5$) pair or the cumene hydroperoxide/thionyl chloride ($SOCl_2$) pair.
in step e), a polymerization coinitiator, preferably azobis (isobutyronitrile), is introduced into the inerted emulsion.
in step a), the pH of the aqueous phase is adjusted between 3.0 and 7.0, more particularly between 3.5 and 6.5, more particularly still between 4.0 and 6.5.
the reaction medium derived from step e) is concentrated by distillation before carrying out step f).
the reaction medium derived from step e) or f) is spray-dried.

The term "oil (O)" notably denotes, in the definition of said self-invertible inverse latex:
linear alkanes including from 11 to 19 carbon atoms;
branched alkanes comprising from 7 to 40 carbon atoms, such as isododecane, isopentadecane, isohexadecane, isoheptadecane, isooctadecane, isononadecane or isoeicosane, or mixtures of some of them, such as those mentioned below and identified by their INCI name:

$C_{7-8}$ isoparaffin, $C_{8-9}$ isoparaffin, $C_{9-11}$ isoparaffin, $C_{9-12}$ isoparaffin, $C_{9-13}$ isoparaffin, $C_{9-14}$ isoparaffin, $C_{9-16}$ isoparaffin, $C_{10-11}$ isoparaffin, $C_{10-12}$ isoparaffin, $C_{19-13}$ isoparaffin, $C_{11-12}$ isoparaffin, $C_{11-13}$ isoparaffin, $C_{11-14}$ isoparaffin, $C_{12-14}$ isoparaffin, $C_{12-29}$ isoparaffin, $C_{13-14}$ isoparaffin, $C_{13-16}$ isoparaffin;
cycloalkanes optionally substituted with one or more linear or branched alkyl radicals;
white mineral oils, such as the products sold under the following names: Marcol™ 52, Marcol™ 82, Drakeol™ 6VR, Eolane™ 130 or Eolane™ 150;
hemisqualane (or 2,6,10-trimethyldodecane; CAS number: 3891-98-3), squalane (or 2,6,10,15,19,23-hexamethyltetracosane), hydrogenated polyisobutene or hydrogenated polydecene;
mixtures of alkanes including from 15 to 19 carbon atoms, said alkanes being linear alkanes, branched alkanes and cycloalkanes, and more particularly the mixture (MO which comprises, per 100% of its weight, a proportion by weight of branched alkanes of greater than or equal to 90% and less than or equal to 100%; a proportion by weight of linear alkanes of greater than or equal to 0% and less than or equal to 9%, and more particularly less than 5%, and a proportion by weight of cycloalkanes of greater than or equal to 0% and less than or equal to 1%, for example the mixtures sold under the name Emogreen™ L15 or Emogreen™ L19;
the fatty alcohol ethers of formula (IV):

$$Z_1\text{—}O\text{—}Z_2 \qquad (IV),$$

in which $Z_1$ and $Z_2$, which may be identical or different, represent a linear or branched alkyl radical including from 5 to 18 carbon atoms, for example dioctyl ether, didecyl ether, didodecyl ether, dodecyl octyl ether, dihexadecyl ether, (1,3-dimethylbutyl) tetradecyl ether, (1,3-dimethylbutyl) hexadecyl ether, bis(1,3-dimethylbutyl) ether or dihexyl ether;
monoesters of fatty acids and of alcohols of formula (V):

$$R'_1\text{—}(C\!=\!O)\text{—}O\text{—}R'_2 \qquad (V),$$

in which $R'_1$—(C=O) represents a saturated or unsaturated and linear or branched acyl radical comprising from 8 to 24 carbon atoms and $R'_2$ represents, independently of $R'_1$, a saturated or unsaturated and linear or branched hydrocarbon-based chain comprising from 1 to 24 carbon atoms, for example methyl laurate, ethyl laurate, propyl laurate, isopropyl laurate, butyl laurate, 2-butyl laurate, hexyl laurate, methyl cocoate, ethyl cocoate, propyl cocoate, isopropyl cocoate, butyl cocoate, 2-butyl cocoate, hexyl cocoate, methyl myristate, ethyl myristate, propyl myristate, isopropyl myristate, butyl myristate, 2-butyl myristate, hexyl myristate, octyl myristate, methyl palmitate, ethyl palmitate, propyl palmitate, isopropyl palmitate, butyl palmitate, 2-butyl palmitate, hexyl palmitate, octyl palmitate, methyl oleate, ethyl oleate, propyl oleate, isopropyl oleate, butyl oleate, 2-butyl oleate, hexyl oleate, octyl oleate, methyl stearate, ethyl stearate, propyl stearate, isopropyl stearate, butyl stearate, 2-butyl stearate, hexyl stearate, octyl stearate, methyl isostearate, ethyl isostearate, propyl isostearate, isopropyl isostearate, butyl isostearate, 2-butyl isostearate, hexyl isostearate or isostearyl isostearate;

diesters of fatty acids and of glycerol of formula (VI) and of formula (VII):

[Chem 3]

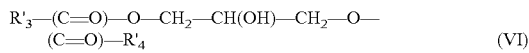
(VI)

[Chem 4]

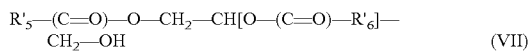
(VII)

in which formulae (VI) and (VII) R'$_3$—(C=O), R'$_4$—(C=O), R'$_5$—(C=O) and R'$_6$—(C=O), which are identical or different, represent a saturated or unsaturated and linear or branched acyl group comprising from 8 to 24 carbon atoms;

triesters of fatty acids and of glycerol of formula (VIII):

[Chem 5]

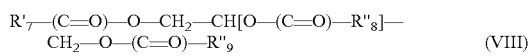
(VIII)

in which R'$_7$—(C=O), R'$_8$—(C=O) and R'$_9$—(C=O), which are identical or different, represent a saturated or unsaturated and linear or branched acyl group comprising from 8 to 24 carbon atoms.

According to another particular aspect of the present invention, said oil (O) is chosen from undecane, tridecane, isododecane or isohexadecane, mixtures of alkanes and isoalkanes and cycloalkanes, such as the mixture (MO as defined above and the mixtures sold under the name Emogreen™ L15, Emogreen™ L19, Emosmart™ L15, Emosmart™ L19, Emosmart™ V21, Isopar™ L or Isopar™ M; the white mineral oils sold under the name Marcol™ 52, Marcol™ 82, Drakeol™ 6VR, Eolane™ 130 or Eolane™ 150; hemisqualane, squalane, hydrogenated polyisobutene or hydrogenated polydecene; dioctyl ether or didecyl ether; isopropyl myristate, hexyl palmitate, octyl palmitate, isostearyl isostearate, octanoyl/decanoyl triglyceride, hexadecanoyl/octadecanoyl triglyceride or the triglycerides resulting from rapeseed oil, sunflower oil, linseed oil or palm oil.

particularly esters of anhydrohexitol chosen from anhydrosorbitols and anhydromannitols and of linear or branched, saturated or unsaturated aliphatic carboxylic acids comprising from 12 to 22 carbon atoms, optionally substituted with one or more hydroxyl groups.

According to another particular aspect of the present invention, said emulsifying system ($S_1$) of water-in-oil type is chosen from the elements of the group consisting of sorbitan laurate, for example the product sold under the name Montane™ 20, sorbitan palmitate, for example the product sold under the name Montane™ 40, sorbitan stearate, for example the product sold under the name Montane™ 60, sorbitan oleate, for example the product sold under the name Montane™ 80, sorbitan sesquioleate, for example the product sold under the name Montane™ 85, sorbitan trioleate, for example the product sold under the name Montane™ 83, sorbitan isolaurate, sorbitan isostearate, for example the product sold under the name Montane™ 70, mannitan laurate, mannitan oleate, or a mixture of these esters; polyesters with a molecular weight of between 1000 and 3000 and derived from condensation between a poly(isobutenyl)succinic acid or the anhydride thereof, such as Hypermer™ 2296, or the mixture sold under the brand name Simaline™ IE 501 A, the polyglycol polyhydroxystearates of formula (IX):

[Chem 6]

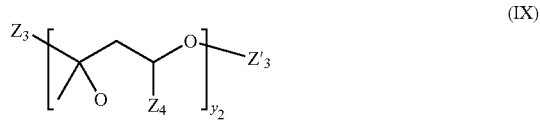
(IX)

in which formula (IX) $y_2$ represents an integer greater than or equal to 2 and less than or equal to 50, $Z_4$ represents a hydrogen atom, a methyl radical or an ethyl radical, and $Z_3$ represents a radical of formula (X):

[Chem 7]

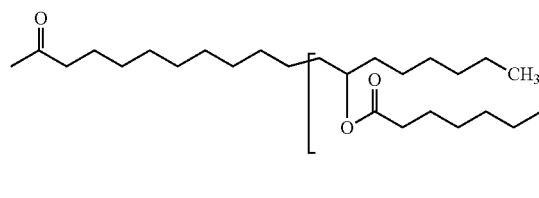
(X)

In said self-invertible inverse latex which is a subject of the present invention, the emulsifying surfactant system ($S_1$) of water-in-oil type consists either of a single emulsifying surfactant or of a mixture of emulsifying surfactants, provided that said resulting emulsifying surfactant system ($S_1$) has a sufficiently low HLB value to bring about the formation of emulsions of water-in-oil type.

As emulsifying surfactant ($S_1$) of water-in-oil type, examples include esters of anhydrohexitol and of linear or branched, saturated or unsaturated aliphatic carboxylic acids, comprising from 12 to 22 carbon atoms, optionally substituted with one or more hydroxyl groups, and more in which formula (X) $y'_2$ represents an integer greater than or equal to 0 and less than or equal to 10, more particularly greater than or equal to 1 and less than or equal to 10, and $Z'_3$ represents a radical of formula (X) as defined above, with $Z'_3$ being identical to or different than $Z_3$, or a hydrogen atom.

There is, as example of emulsifying surfactant of water-in-oil type of formula (IX) which can be used to prepare the emulsifying system ($S_1$), PEG-30 dipolyhydroxystearate sold under the name Simaline™ WO, or else mixtures comprising PEG-30 dipolyhydroxystearate and sold under the names Simaline™ IE 201 A and Simaline™ IE 201 B, or else the mixture comprising trimethylolpropane-30 tripolyhydroxystearate sold under the name Simaline™IE 301 B.

According to a particular aspect of the invention, the emulsifying system of oil-in-water type (Sz) comprises, per 100% of its weight, a proportion of greater than or equal to 50% by weight and less than or equal to 100% of a composition (Ce) which comprises, per 100% of its weight:

from 10% by weight to 60% by weight, more particularly from 15% by weight to 60% by weight and very particularly from 15% by weight to 50% by weight of at least one compound of formula (I):

[Chem 8]

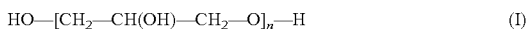

$$HO-[CH_2-CH(OH)-CH_2-O]_n-H \quad (I)$$

in which n represents an integer greater than or equal to 1 and less than or equal to 15;

from 40% by weight to 90% by weight, more particularly from 40% by weight to 85% by weight and very particularly from 50% by weight to 85% by weight of at least one compound of formula (II):

[Chem 9]

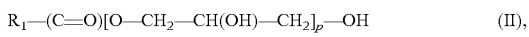

$$R_1-(C=O)[O-CH_2-CH(OH)-CH_2]_p-OH \quad (II),$$

in which p, which is different from or identical to n, represents an integer greater than or equal to 1 and less than or equal to 15; and in which the group $R_1-(C=O)-$ represents a saturated or unsaturated, linear or branched aliphatic radical comprising from 6 to 22 carbon atoms; and optionally up to 30% by weight, more particularly from 0% by weight to 25% by weight and very particularly from 0% by weight to 20% by weight of at least one composition ($C_{IA}$) represented by the formula (III):

[Chem 10]

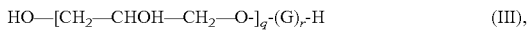

$$HO-[CH_2-CHOH-CH_2-O-]_q-(G)_r-H \quad (III),$$

in which q, which is different than or identical to n, represents an integer greater than or equal to 1 and less than or equal to 3, G represents a reducing sugar residue and r represents a decimal number greater than or equal to 1.05 and less than or equal to 5.00, said composition ($C_{11}$) consisting of a mixture of the compounds of formulae ($III_1$), ($III_2$), ($III_3$), ($III_4$) and ($III_5$):

[Chem 11]

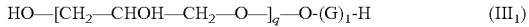

$$HO-[CH_2-CHOH-CH_2-O-]_q-O-(G)_1-H \quad (III_1)$$

[Chem 12]

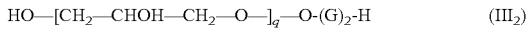

$$HO-[CH_2-CHOH-CH_2-O-]_q-O-(G)_2-H \quad (III_2)$$

[Chem 13]

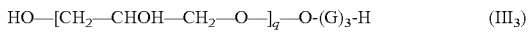

$$HO-[CH_2-CHOH-CH_2-O-]_q-O-(G)_3-H \quad (III_3)$$

[Chem 14]

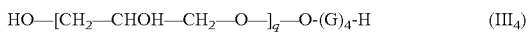

$$HO-[CH_2-CHOH-CH_2-O-]_q-O-(G)_4-H \quad (III_4)$$

[Chem 15]

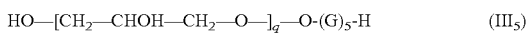

$$HO-[CH_2-CHOH-CH_2-O-]_q-O-(G)_5-H \quad (III_5)$$

in molar proportions of said compounds of formulae ($III_1$), ($III_2$), ($III_3$), ($III_4$) and ($III_5$) respectively equal to $a_1$, $a_2$, $a_3$, $a_4$ and $a_5$, such that the sum ($a_1+a_2+a_3+a_4+a_5$) is equal to 1, and such that the sum ($a_1+2a_2+3a_3+4a_4+5a_5$) is equal to r.

The emulsifying system ($S_2$) of oil-in-water type consists either of the composition (Ce) alone or of a mixture of said composition (Ce) with one or more other emulsifying surfactants, provided that said resulting emulsifying system ($S_2$) has a sufficiently high HLB value to bring about the formation of emulsions of oil-in-water type.

The term "reducing sugar" denotes, in formula (III) as defined above, the saccharide derivatives that do not have, in their structures, any glycoside bond established between an anomeric carbon and the oxygen of an acetal group as defined in the reference publication: "Biochemistry", Daniel Voet/Judith G. Voet, page 250, John Wiley & Sons, 1990. The oligomeric structure $(G)_x$ may be in any isomeric form, whether it is optical isomerism, geometrical isomerism or regioisomerism; it may also represent a mixture of isomers.

Regarding the polymerization reaction, it is initiated in step e) at a preferential temperature of 10° C., then carried out either quasi-adiabatically up to a temperature above or equal to 60° C., or by controlling the temperature.

Another subject of the invention is the use of said self-invertible inverse latex as defined above, as a thickener and/or emulsifier and/or stabilizer for a detergent liquid aqueous composition for domestic or industrial use.

According to a particular aspect, said use consists in thickening polar phases, for instance aqueous, alcoholic or aqueous-alcoholic phases or polar phases comprising polyols such as glycerol.

According to another particular aspect, said use consists in stabilizing an emulsion of oil-in-water type, or of water-in-oil type, giving said emulsion a homogeneous appearance during storage under various conditions, and more particularly at 25° C. for a time at least equal to one month, and more particularly at 4° C. for a time at least equal to one month, and more particularly at 45° C. for a time at least equal to one month.

According to another particular aspect, said use consists in stabilizing solid particles in detergent liquid aqueous compositions for domestic or industrial use.

These solid particles to be suspended may have various regular or irregular geometries, and may be in the form of pearls, beads, rods, flakes, strips or polyhedra. These solid particles are characterized by an apparent mean diameter of between 1 μm and 5 mm, more particularly between 10 μm and 1 mm.

Among the solid particles that may be suspended and stabilized with the self-invertible inverse latex as defined above in detergent liquid aqueous compositions for domestic or industrial use are micas, iron oxide, titanium oxide, zinc oxide, aluminium oxide, talc, silica, kaolin, clays, boron nitride, calcium carbonate, magnesium carbonate, magnesium hydrogen carbonate, inorganic coloured pigments, polyamides such as Nylon-6, polyethylenes, polypropylenes, polystyrenes, polyesters, acrylic or methacrylic polymers such as polymethyl methacrylates, polytetrafluoroethylene, crystalline or microcrystalline waxes, porous spheres, selenium sulfide, zinc pyrithione, starches, alginates, plant fibres, loofah particles and sponge particles. Said detergent liquid aqueous composition (F) that is the subject of the present invention is notably in the form of an aqueous solution, an emulsion or a microemulsion with an aqueous continuous phase, an emulsion or a microemulsion with an oily continuous phase, an aqueous gel, a foam, or else in the form of an aerosol. It may be applied directly by soaking, by spraying or by vaporizing onto the surface to be cleaned or else by means of any type of support intended to be placed in contact with the solid surface to be cleaned (paper, wipe, textile). In general, said detergent liquid aqueous composition (F) that is the subject of the present invention also comprises ingredients usually used in the field of cleaning solid surfaces or textile fibres, such as nonionic, cationic or amphoteric surfactants, cationic or nonionic polymers, thickeners, enzymes, bleaching agents, anticorrosion agents, solvents, acidic agents, alkaline agents, anti-limescale agents, preserving agents, fragrances, colorants, repellents, oxidizing agents, detergency adjuvants, anti-soiling agents or anti-redeposition agents.

Among the detergent surfactants capable of being used for the preparation of the detergent liquid aqueous composition (F) as defined above, mention may be made of surfactants that give the detergent liquid aqueous composition (F) their ability to remove soiling present on the solid surfaces and to keep it in suspension, in order to then be removed during the rinsing step.

These detergent surfactants may be of anionic, cationic, amphoteric or nonionic nature. Among the anionic detergent surfactants capable of being used for the preparation of the detergent liquid aqueous composition (F) as defined above, mention may be made of alkali metal salts, alkaline-earth metal salts, ammonium salts, amine salts, amino alcohol salts of alkyl ether sulfates, of alkyl sulfates, of alkylamido ether sulfates, of alkylaryl polyether sulfates, of monoglyceride sulfates, of alpha-olefin sulfonates, of paraffin sulfonates, of alkyl phosphates, of alkyl ether phosphates, of alkyl sulfonates, of alkylamide sulfonates, of alkylaryl sulfonates, of alkyl carboxylates, of alkyl sulfosuccinates, of alkyl ether sulfosuccinates, of alkylamide sulfosuccinates, of alkyl sulfoacetates, of alkyl sarcosinates, of acyl isethionates, of N-acyl taurates, of acyl lactylates, of N-acyl amino acid derivatives, of N-acyl peptide derivatives, of N-acyl protein derivatives and of fatty acids.

Among the amphoteric detergent surfactants capable of being used for the preparation of the detergent liquid aqueous composition (F) as defined above, mention may be made of alkyl betaines, alkyl amido betaines, sultaines, alkyl amidoalkyl sulfobetaines, imidazoline derivatives, phosphobetaines, amphopolyacetates and amphopropionates.

Among the cationic detergent surfactants capable of being used for the preparation of the detergent liquid aqueous composition (F) as defined above, mention may particularly be made of quaternary ammonium derivatives.

Among the nonionic detergent surfactants capable of being used for the preparation of the detergent liquid aqueous composition (F) as defined above, mention may particularly be made of alkyl polyglycosides comprising a linear or branched, saturated or unsaturated aliphatic radical and comprising from 8 to 16 carbon atoms; castor oil derivatives, polysorbates, coconut amides and N-alkylamines.

Among the mineral acids that are particularly chosen as acidic agents in said detergent liquid aqueous composition (F), mention may be made of hydrochloric acid, nitric acid, phosphoric acid, sulfuric acid, hypophosphorous acid, phosphorous acid, hypochlorous acid, perchloric acid, carbonic acid, boric acid, manganic acid, permanganic acid, chromic acid, periodic acid, iodic acid, hypoiodous acid, hydrobromic acid, hydroiodic acid and hydrofluoric acid.

Among the organic acids that are particularly chosen as acidic agents in said detergent liquid aqueous composition (F), mention may be made of formic acid, acetic acid, propionic acid, benzoic acid, salicylic acid, oxalic acid, malonic acid, succinic acid, glutaric acid, adipic acid, glycolic acid, lactic acid, malic acid, maleic acid, tartaric acid, citric acid, sorbic acid, sulfamic acid, dihydroacetic acid, dimethylsulfamic acid, fumaric acid, glutamic acid, isopropylsulfamic acid, valeric acid, benzenesulfonic acid, xylenesulfonic acid, 2-ethylhexanoic acid, capric acid, caproic acid, cresylic acid, dodecylbenzenesulfonic acid, peracetic acid, monochloroacetic acid and gluconic acid.

Among the alkaline agents associated with said self-invertible inverse latex as defined above in said detergent liquid aqueous composition (F), mention may be made of the elements of the group consisting of alkali metal or alkaline-earth metal hydroxides, for instance sodium hydroxide, potassium hydroxide, barium hydroxide and calcium hydroxide.

Among the anti-limescale agents associated with said self-invertible inverse latex as defined above in said detergent liquid aqueous composition (F), mention may be made of the elements of the group consisting of sequestrants, for instance sodium tripolyphosphate (TPP), ethylenediaminetetraacetate (EDTA), tetraacetylethylenediamine (TAED), methylglycine diacetate (MGDA), sodium nitrilotriacetate (Na3NTA), sodium or potassium gluconate, sodium or potassium erythorbate, sodium or potassium polycarboxylate, and sodium citrate, of ion-exchange agents, for instance sodium zeolites or aluminosilicates, or lamellar sodium silicates, and precipitating agents, for instance calcium carbonate and sodium metasilicate.

The sequestrants, and more particularly the sequestrants described above, have the effect of complexing calcium and magnesium ions to form water-soluble complexes which are then removed during rinsing. The ion-exchange agents, and more particularly the ion-exchange agents described above, have the effect of exchanging their sodium ions with calcium and magnesium ions. The precipitating agents, and more particularly the sequestrants described above, have the effect of removing the ions responsible for the hardness of water by forming insoluble calcium compounds, which are subsequently removed with the soiling on the cleaned surfaces.

According to a more particular aspect, in said detergent liquid aqueous composition (F), the anti-limescale agent is chosen from the elements of the group consisting of sodium metasilicate, sodium tripolyphosphate (TPP), ethylenediaminetetraacetate (EDTA), tetraacetylethylenediamine (TAED), methylglycine diacetate (MGDA), sodium nitrilotriacetate (Na3NTA), sodium gluconate, sodium citrate and calcium carbonate.

Among the nonionic surfactants that may be associated with said self-invertible inverse latex as defined above in said detergent liquid aqueous composition (F), mention may be made of:
  block copolymers of ethylene oxide and of propylene oxide, and most particularly the block copolymers of ethylene oxide and of propylene oxide sold under the brand name Pluronic™ by the company BASF, for instance Pluronic™ PE 6100 and Pluronic™ PE 6200, defoaming nonionic surfactants of formula ($A_1$):

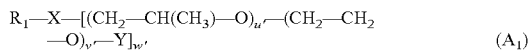

$$R_1-X-[(CH_2-CH(CH_3)-O)_{u'}-(CH_2-CH_2-O)_{v'}-Y]_{w'} \quad (A_1)$$

in which $R_1$ represents a saturated or unsaturated, linear or branched hydrocarbon-based aliphatic radical comprising from 6 to 18 carbon atoms, X represents a nitrogen atom or an oxygen atom, u' and v', which may be identical or different, each represent an integer between 1 and 50, w' is either equal to 1 if X represents an oxygen atom, or equal to 1 or to 2 if X represents a nitrogen atom, and Y represents a blocking functional group chosen from the elements of the group consisting of linear alkyl radicals comprising from 4 to 8 carbon atoms, for instance the butyl radical, the benzyl radical or a butylene oxide group.

Among the defoaming nonionic surfactants of formula ($A_1$), mention may be made of the products sold under the brand name Tergitol™ by the company Dow Chemical, for instance Tergitol™ L61E and Tergitol™ L64E, sparingly foaming nonionic surfactants of formula ($A_2$):

$$R_8-O-(S')_{q'}-H \quad (A_2)$$

in which S' represents a reducing sugar residue chosen from the elements of the group consisting of glucose, xylose and arabinose, $R_8$ represents a saturated, linear or branched hydrocarbon-based radical comprising from 6 to 10 carbon atoms and q' represents a decimal number greater than or equal to 1.05 and less than or equal to 5.

As examples of sparingly foaming nonionic surfactants of formula ($A_2$) optionally present in said detergent liquid aqueous composition (F), mention may be made of hexyl polyglucosides, 2-ethylhexyl polyglucosides, n-heptyl polyglucosides and n-octyl polyglucosides.

Among the foaming and/or detergent amphoteric surfactants that may be associated with said self-invertible inverse latex as defined above in said detergent liquid aqueous composition (F), there are alkyl betaines, alkyl amido betaines, sultaines, alkyl amidoalkyl sulfobetaines, imidazoline derivatives, phosphobetaines, amphopolyacetates and amphopropionates, β-alanine, and sodium N-(2-carboxyethyl)-N-(2-ethylhexyl) sold under the brand name Tomamine® 30 Amphoteric 400 Surfactant.

Among the nonionic surfactants that may be associated with said self-invertible inverse latex as defined above in said detergent liquid aqueous composition (F), mention may be made of alkoxylated monoglycerides, alkoxylated diglycerides, alkoxylated terpenic hydrocarbons such as ethoxylated and/or propoxylated α- or β-pinenes, containing from 1 to 30 oxyethylene and/or oxypropylene units, products resulting from the condensation of ethylene oxide or of propylene oxide with ethylenediamine, such as the Tetronic™ products sold by BASF, ethoxylated and/or propoxylated C8-C18 fatty acids containing from 5 to 25 mol of ethylene oxide and/or propylene oxide, ethoxylated fatty amides containing from 5 to 30 mol of ethylene oxide, ethoxylated amines containing from 5 to 30 mol of ethylene oxide, alkoxylated amidoamines containing from 1 to 50, preferably from 1 to 25 and most particularly from 2 to 20 mol of ethylene oxide and/or of propylene oxide.

Among the thickeners and/or gelling agents that may be associated with said self-invertible inverse latex as defined above in said detergent liquid aqueous composition (F), mention may be made of polysaccharides consisting only of monosaccharides, such as glucans or glucose homopolymers, glucomannoglucans, xyloglycans, galactomannans of which the degree of substitution (DS) of the D-galactose units on the main D-mannose chain is between 0 and 1, and more particularly between 1 and 0.25, such as galactomannans originating from *cassia* gum (DS=1/5), locust bean gum (DS=1/4), tara gum (DS=1/3), guar gum (DS=1/2) or fenugreek gum (DS=1).

Among the thickeners and/or gelling agents that may be associated with said self-invertible inverse latex as defined above in said detergent liquid aqueous composition (F), mention may be made of polysaccharides consisting of monosaccharide derivatives, such as sulfated galactans and more particularly carrageenans and agar, uronans and more particularly algins, alginates and pectins, heteropolymers of monosaccharides and of uronic acids, and more particularly xanthan gum, gellan gum, acacia gum exudates and karaya gum exudates, glucosaminoglycans. Among the thickeners and/or gelling agents that may be associated with said self-invertible inverse latex as defined above in said detergent liquid aqueous composition (F), mention may be made of cellulose, cellulose derivatives such as methyl cellulose, ethyl cellulose, hydroxypropyl cellulose, silicates, starch, hydrophilic starch derivatives, and polyurethanes.

Among the thickeners and/or gelling agents that may be associated with said self-invertible inverse latex as defined above in said detergent liquid aqueous composition (F), mention may be made of inorganic thickeners, for instance clays, hectorite, saponite, sauconite, vermiculite or colloidal silica.

The thickeners present in composition (F) that is the subject of the present invention are used in amounts of between 0.1% and 10% by weight. Among the abrasive agents that may be associated with said self-invertible inverse latex as defined above in said detergent liquid aqueous composition (F), mention may be made of materials of natural origin, for instance wood or kernel chips, inorganic abrasive materials such as oxides, quartzes, diatomaceous earths, colloidal silica dioxides, organic abrasive materials such as polyolefins, for instance polyethylenes and polypropylenes, polystyrenes, acetonitrile-butadiene-styrene resins, melamines, phenolic resins, epoxy resins or polyurethane resins.

The abrasive agents present in composition (F) that is the subject of the present invention are used in amounts of between 5.0% and 30% by weight.

Among the solvents that may be associated with said self-invertible inverse latex as defined above in said detergent liquid aqueous composition (F), mention may be made of isopropyl alcohol, benzyl alcohol, 1,3-propanediol, chlorinated solvents, acetone, methyl ethyl ether, methyl isobutyl ether, butyl acetate, ethyl acetate, isopropyl acetate, isobutyl acetate, aromatic solvents, isoparaffins, isododecane, ethyl lactate, butyl lactate, terpenic solvents, rapeseed methyl esters, sunflower methyl esters, propylene glycol n-methyl ether, dipropylene glycol n-methyl ether, tripropylene glycol n-methyl ether, propylene glycol n-butyl ether, dipropylene glycol n-butyl ether, tripropylene glycol n-butyl ether, propylene glycol n-propyl ether, dipropylene glycol n-propyl ether, propylene glycol monomethyl ether acetate, propylene glycol diacetate, propylene glycol phenyl ether, ethylene glycol phenyl ether or dipropylene glycol dimethyl ether.

As examples of solvents present in composition (F) that is the subject of the present invention, mention may be made more particularly of the elements from the group consisting of propylene glycol n-methyl ether, dipropylene glycol n-methyl ether, tripropylene glycol n-methyl ether, propylene glycol n-butyl ether, dipropylene glycol n-butyl ether, tripropylene glycol n-butyl ether, propylene glycol n-propyl ether, dipropylene glycol n-propyl ether, propylene glycol phenyl ether, ethylene glycol phenyl ether, dipropylene glycol dimethyl ether, rapeseed methyl esters and sunflower methyl esters.

Among the enzymes that may be associated with said self-invertible inverse latex as defined above in said detergent liquid aqueous composition (F), mention may be made of proteases, amylases, lipases, cellulases and peroxidases.

The enzymes present in composition (F) that is the subject of the present invention are used in amounts of between 0.005% and 0.5% by weight.

According to another aspect, a subject of the invention is the use of said detergent liquid aqueous composition (F) as defined above, for cleaning solid surfaces.

The expression "for cleaning solid surfaces" denotes any action intended for removing soiling present on surfaces consisting of various materials.

The surfaces to be cleaned may be solid surfaces or textile surfaces. The term "solid surfaces" denotes, for example, floors, walls, window panes, tiles, household electrical appliances, kitchenware, countertops, tapware, sinks, tanks for storing chemical, food or agricultural products, vehicles (motor vehicles, motorbikes, trucks, etc.). The materials constituting these solid surfaces are, for example, glass (soda-lime, fluorocalcium, borosilicate, crystal), porcelain, earthenware, ceramic, polycarbonate or polypropylene plastics, stainless steel, silver, copper, aluminium, wood, synthetic resins, glass-ceramic or linoleum, and may be coated with paints or varnishes. As examples of soiling that is present on these solid surfaces and that is to be removed by cleaning, mention may for example be made of food residues, grease, light and heavy hydrocarbons, burnt residues, dust, sludge, finger marks, soap residues and microorganisms.

According to another aspect, a subject of the invention is a process for cleaning a solid surface, characterized in that it comprises at least one first step a"1) of applying said detergent liquid aqueous composition (F) as defined above, followed by at least one second step b"1) of rinsing said solid surface.

In step a"1) of the process as defined above, said detergent liquid aqueous composition (F) is applied to the surface comprising the soiling to be cleaned by any means, for instance by total immersion, by spraying or by application by means of a support consisting of synthetic or natural, woven or nonwoven textile fibres, or paper, impregnated beforehand with said composition.

In step b"1) of the process as defined above, the rinsing of the solid surface onto which composition (F) for domestic or industrial use has been applied during step a"1) is performed by total immersion or by spraying with water. Step b"1) of the cleaning process that is the subject of the invention may be performed at room temperature or at a temperature of between 30° C. and 80° C., more particularly at a temperature of between 30° C. and 65° C.

DESCRIPTION OF THE PREFERRED EMBODIMENTS

The example that follows illustrates the invention without, however, limiting it.

I. Example 1.1 Preparation of an Inverse Latex ($LI_1$) Comprising a Crosslinked Copolymer of the Sodium Salt of 2-methyl-[(1-oxo-2-propenyl)amino]-1-Propanesulfonic Acid and of Acrylamide Containing Glutamic Acid, N,N-diacetic Acid, Tetrasodium Salt as Sequestrant.

The following are charged to a beaker, with stirring:
 272 g of a commercial solution containing 55% of sodium salt of 2-methyl-[(1-oxo-2-propenyl)amino]-1-propanesulfonic acid,
 255 g of a solution containing 50% of acrylamide,
 115 g of 2-methyl-[(1-oxo-2-propenyl)amino]-1-propanesulfonic acid,
 0.115 g of methylenebis(acrylamide),
 0.6 g of a commercial solution of glutamic acid, N,N-diacetic acid, tetrasodium salt,
 0.14 g of copper sulfate pentahydrate.

The pH of the aqueous phase is adjusted to 6 with a 48% sodium hydroxide solution. The organic phase is prepared at the same time by mixing:
 220 grams of isohexadecane,
 21 grams of Montane™ 80[(1)].

(1): Montane™ 80 is a sorbitan monooleate, emulsifying surfactant of water-in-oil type, sold by the company SEPPIC.

The aqueous phase prepared above is gradually added to the oily phase and then dispersed using a rotor-stator of Ultra Turrax™ type sold by the company IKA™.

The emulsion obtained is then transferred to a jacketed reactor, and subjected to nitrogen bubbling in order to remove the oxygen. A solution containing 0.56% by weight of cumene hydroperoxide in 5 ml of isohexadecane is introduced and the emulsion is kept stirring for 5 minutes of homogenization at room temperature.

The polymerization reaction is initiated by adding 15 ml of an aqueous solution containing 0.2% sodium metabisulfite. Once the polymerization reaction has finished, the reaction medium is heated at 85° C. for 1 h and then the whole medium is cooled to around 35° C., then 50 g of Montanox™ 80[(2)] are added to the preparation.

(2): Montanox™ 80 is a polyoxyethylenated derivative of a sorbitan monooleate, used as surfactant of oil-in-water type, sold by the company SEPPIC.

The product obtained is referenced ($LI_1$) and the results of its evaluations are given in Table 1.

1.2 Preparation of an Inverse Latex (LI$_2$) Comprising a Crosslinked Copolymer of the Sodium Salt of 2-methyl-[(1-oxo-2-oropenyl)amino]-1-Propanesulfonic Acid and of Acrylamide Containing Sodium Diethylenetriaminepentaacetate as Sequestrant.

The same protocol as in example 1.1 is used but the 0.6 g of a commercial solution of glutamic acid, N,N-diacetic acid, tetrasodium salt are replaced by 0.45 g of a solution of sodium diethylenetriaminepentaacetate (sold under the brand name Versenex™ 80).

The product is referenced (LI$_2$).

(LI$_6$) according to the invention is then introduced into the aqueous solution and mixed until a gel of stable viscosity is obtained.

II. Sodium hydroxide is then gradually introduced with mechanical stirring at a temperature of 20° C. until a homogeneous gel is obtained. The gel obtained on conclusion of step b) is of homogeneous and clear appearance, with a viscosity of 10 000 mPa·s (Brookfield LVT at a speed of 6 rpm). After a period of storage of 6 months at 25° C., the gel obtained on conclusion of step b) of this procedure has a homogeneous and clear appearance, with a viscosity of 12 000 mPa·s (Brookfield LVT at a speed of 6 rpm).

TABLE 1

| | | | | Analyses | | |
|---|---|---|---|---|---|---|
| | Sequestrant | | | | | |
| | (amount in | Polymerization | | Viscosity of latex at 25° C. (mPa · s) (Brookfield RVT, | Viscosity of aqueous gel containing 2 wt %, mPa · s (Brookfield | Viscosity of aqueous gel containing 3 wt % + 0.1% NaCl, mPa · s (Brookfield RVT, |
| Test no | molar ppm) (*) | Inhibition (min) | Exothermicity (° C.) | Polymerization time (min) | Spindle 3 Speed 20) | RVT, Spindle 6 Speed 5) | Spindle 6 Speed 5) |
| (LI$_2$) | Versenex ™ 80 120 ppm | 1 | 52.2 | 12 | 2500 | 97 000 | 9100 |
| (LI$_1$) | Dissolvine ™ GLDA 47S (275 ppm) | 0 | 51.8 | 13 | 2215 | 91 400 | 11 540 |

Properties of the copolymers obtained in examples 1.1 and 1.2.

In conclusion, the tests of copolymerization of 2-methyl-[(1-oxo-2-propenyl)amino]-1-propanesulfonic acid and of acrylamide show that in the presence of copper cations, the glutamic acid, N,N-diacetic acid, tetrasodium salt has a similar efficacy to the sodium diethylenetriaminepentaacetate.

In each of the tests, the polymerization has similar characteristics: inhibition time, polymerization time and exothermicity. The self-invertible inverse latices obtained under these conditions have equivalent thickening properties in water and in the presence of electrolytes.

II. Illustrative Detergent Formulations

In the formulations below, the percentages are expressed as weight percentages per 100% of the weight of the formulation.

II$_A$—Cleaning Composition for Ovens and Cooking Grills

| Ingredients | Weight content |
|---|---|
| SIMULSOL ™OX1309L$^{(1)}$ | 2% |
| SIMULSOL ™SL7G$^{(2)}$ | 2% |
| Composition (LI$_6$) | 6% |
| Sodium hydroxide: | 25% |
| Water: | qs 100% |

$^{(1)}$Simulsol ™ OX1309L: detergent surfactant composition sold by the company SEPPIC, comprising polyethoxylated alcohols resulting from the reaction of 1 molar equivalent of an alcohol sold under the brand name Exxal ™13 with 9 molar equivalents of ethylene oxide.
$^{(2)}$Simulsol ™SL7G: solution of n-heptyl polyglucosides, hydrotropic and solubilizing agent sold by the company SEPPIC.

Preparation

I. A pre-gel is prepared at 20° C. by adding Simulsol™ OX1309L and then Simulsol™SL7G in water. Composition Cleaning Process The composition prepared above is sprayed at room temperature onto the walls of an oven soiled with food grease and onto cooking grills also soiled with food grease. After 10 minutes, the walls of the oven and the cooking grills are rinsed with hot water at 60° C. The walls of the oven and the surfaces of the cooking grills thus cleaned no longer have any soiling.

II$_B$—Cleaner for Aluminium Surfaces

| Ingredients | Weight content |
|---|---|
| Simulsol ™OX1309L | 3% |
| Simulsol ™SL7G | 3% |
| Composition (LI$_6$) | 5% |
| 75% Phosphoric acid | 40% |
| Hordaphos$^{(3)}$ MDGB 1% | 5% |
| Dipropylene glycol methyl ether | 5% |
| Water: | qs 100% |

$^{(3)}$Hordaphos ™ MDGB is a composition based on phosphoric esters, used as an anticorrosion agent.

Preparation

Each ingredient is successively introduced into a mixing tank with moderate mechanical stirring, at room temperature, until a homogeneous, clear composition is obtained. Stirring is maintained for 30 minutes at 20° C. The composition obtained has a measured pH value of less than 1.0 and is clear and homogeneous after storage for a period of one month at 40° C.

Cleaning Process

The composition prepared in the preceding paragraph is diluted to 3% in water and the solution thus obtained is sprayed onto the aluminium wall to be cleaned. This wall is then rinsed with hot water at 60° C.

The definitions of the products used in the examples are as follows:

Micropearl™ M 100 is an ultrafine powder which is very soft to the touch and which has a mattifying action, sold by the company Matsumo.

Sepicide™ CI, imidazolidinyl urea, is a preservative sold by the company SEPPIC.

Simulsol™ 165 is self-emulsifying glycerol stearate, sold by the company SEPPIC.

Sepicide™ HB, a mixture of phenoxyethanol, methylparaben, ethylparaben, propylparaben and butylparaben, is a preservative sold by the company SEPPIC.

Parsol™ MCX is octyl para-methoxycinnamate, sold by the company Givaudan.

Lanol™ 37T is glycerol triheptanoate, sold by the company SEPPIC.

Solagum™ L is a carrageenan, sold by the company SEPPIC.

Eusolex™ 4360 is a sunscreen, sold by the company Merck.

Deepaline™ PVB is an acylated wheat protein hydrolysate, sold by the company SEPPIC.

Primol™ 352 is a mineral oil, sold by the company Exxon.

Pecosil™ PS 100 is Dimethicone PEG-7, sold by the company Phoenix.

Montanov™ 68 (INCI name: cetearyl alcohol (and) cetearyl glucoside) is an emulsifier, sold by the company SEPPIC.

Montanov™ L (INCI name: C14-22 alcohols (and) C12-20 alkyl glucoside) is an emulsifier sold by the company SEPPIC.

Montanov™ 202 (INCI name: arachidyl alcohol (and) behenyl alcohol (and) arachidyl glucoside) is an emulsifier, sold by the company SEPPIC.

The invention claimed is:

1. Detergent composition (F) suitable for domestic or industrial use comprising, as thickener, a self-invertible inverse latex comprising an aqueous phase comprising:
   a. a crosslinked anionic polyelectrolyte (P) consisting of:
      at least one monomer unit derived from 2-methyl-2-[(1-oxo-2-propenyl)amino]-1-propanesulfonic acid in free acid form or partially or totally salified form;
      at least one monomer unit derived from at least one monomer selected from the group consisting of acrylamide, N,N-dimethylacrylamide, methacrylamide, N-isopropylacrylamide, N-tert-butylacrylamide; and
      at least one monomer unit derived from a polyethylenic crosslinking monomer (AR),
   b. glutamic acid, N,N-diacetic acid, tetrasodium salt.

2. The detergent composition according to claim 1, wherein the aqueous phase of the inverse latex comprises at least 0.01 mol % of the glutamic acid, N,N-diacetic acid, tetrasodium salt.

3. The detergent composition according to claim 1, wherein the polyethylenic crosslinking monomer (AR) is selected from the group consisting of methylenebis(acrylamide), ethylene glycol dimethacrylate, diethylene glycol diacrylate, ethylene glycol diacrylate, diallylurea, triallylamine, trimethylolpropane triacrylate, diallyloxyacetic acid or a salt thereof, or a mixture of these compounds.

4. The detergent composition according to claim 1, wherein the crosslinking monomer (AR) is methylenebis(acrylamide) or triallylamine.

5. The detergent composition according to claim 1, wherein the crosslinked anionic polyelectrolyte of the aqueous phase of the inverse latex comprises per 100 mol %:
   a proportion between 20% and 90% of the monomer unit derived from 2-methyl-2-[(1-oxo-2-propenyl)amino]-1-propanesulfonic acid in free acid form or partially or totally salified form;
   a proportion between 10% and 80% of the monomer unit derived from at least one monomer selected from the group consisting of acrylamide, N,N-dimethylacrylamide, methacrylamide, N-isopropylacrylamide, N-tert-butylacrylamide; and
   a proportion of greater than 0 mol % and less than or equal to 1 mol % of monomer units derived from at least one polyethylenic crosslinking monomer (AR).

6. The detergent composition according to claim 1, comprising between 0.1% and 10% by weight of said inverse latex.

7. Process for preparing a detergent composition suitable for domestic or industrial use comprising, as thickener, a self-invertible inverse latex comprising an aqueous phase comprising:
   a. a crosslinked anionic polyelectrolyte (P) consisting of:
      at least one monomer unit derived from 2-methyl-2-[(1-oxo-2-propenyl)amino]-1-propanesulfonic acid in free acid form or partially or totally salified form;
      at least one monomer unit derived from at least one monomer selected from the group consisting of acrylamide, N,N-dimethylacrylamide, methacrylamide, N-isopropylacrylamide, N-tert-butylacrylamide; and
      at least one monomer unit derived from a polyethylenic crosslinking monomer (AR),
   b. glutamic acid, N,N-diacetic acid, tetrasodium salt,
   said process comprising a step of preparing the inverse latex comprising the following sub-steps:
   a) preparing the aqueous phase,
   b) preparing an organic phase comprising at least one oil (O) and a water-in-oil emulsifying surfactant system ($S_1$),
   c) mixing the aqueous phase and the organic phase prepared in steps a) and b) and emulsifying so as to form an emulsion,
   d) inerting the emulsion with nitrogen,
   e) initiating the polymerization reaction by introducing a free-radical initiator into the inerted emulsion, and
   f) introducing into the reaction medium resulting from step e) an oil-in-water emulsifying surfactant system ($S_2$) at a temperature between 30° C. and 60° C.;
   wherein the aqueous phase comprises the glutamic acid, N,N-diacetic acid, tetrasodium salt.

8. The process according to claim 7, wherein, in step e), the radical initiator is a redox pair which generates hydrogen sulfite ($HSO_3^-$) ions.

9. The process according to claim 7, wherein, in step e), a polymerization coinitiator is introduced into the inerted emulsion.

10. The process according to claim 7, wherein, in step a), the pH of the aqueous phase is adjusted between 3.0 and 7.0.

11. The process according to claim 7, wherein the reaction medium derived from step e) is concentrated by distillation before carrying out step f).

12. The process according to claim 7, wherein the reaction medium derived from step e) or f) is spray-dried.

13. A thickener and/or emulsifier and/or stabilizer for a detergent liquid aqueous composition for domestic or industrial use, comprising the inverse latex of claim 1.

14. Process for cleaning a solid surface, comprising at least one first step a"1) of applying said detergent liquid aqueous composition (F) as defined in claim 1, followed by at least one second step b"1) of rinsing said solid surface.

15. The detergent composition according to claim 1, wherein the polyethylenic crosslinking monomer (AR) is sodium diallyloxyacetate.

16. The process according to claim 8, wherein, in step e), the radical initiator is the cumene hydroperoxide/sodium metabisulfite ($Na_2S_2O_5$) pair or the cumene hydroperoxide/thionyl chloride ($SOCl_2$) pair.

17. The process according to claim 7, wherein, in step e), azobis(isobutyronitrile) is introduced into the inerted emulsion.

18. The detergent composition according to claim 2, wherein the polyethylenic crosslinking monomer (AR) is selected from the group consisting of methylenebis(acrylamide), ethylene glycol dimethacrylate, diethylene glycol diacrylate, ethylene glycol diacrylate, diallylurea, triallylamine, trimethylolpropane triacrylate, diallyloxyacetic acid or a salt thereof, or a mixture of these compounds.

19. The detergent composition according to claim 2, wherein the crosslinking monomer (AR) is methylenebis(acrylamide) or triallylamine.

20. The detergent composition according to claim 2, wherein the crosslinked anionic polyelectrolyte of the aqueous phase of the inverse latex comprises per 100 mol %:

a proportion between 20% and 90% of the monomer unit derived from 2-methyl-2-[(1-oxo-2-propenyl)amino]-1-propanesulfonic acid in free acid form or partially or totally salified form;

a proportion between 10% and 80% of the monomer unit derived from at least one monomer selected from the group consisting of acrylamide, N,N-dimethylacrylamide, methacrylamide, N-isopropylacrylamide, N-tert-butylacrylamide; and a proportion of greater than 0 mol % and less than or equal to 1 mol % of monomer units derived from at least one polyethylenic crosslinking monomer (AR).

\* \* \* \* \*